United States Patent
Pontual et al.

(10) Patent No.: US 9,525,978 B2
(45) Date of Patent: Dec. 20, 2016

(54) METHOD AND APPARATUS FOR TRANSMITTING HIGH BANDWIDTH SIGNALS WITH LOW BANDWIDTH TRANSPONDERS

(71) Applicant: The DIRECTV Group, Inc., El Segundo, CA (US)

(72) Inventors: Romulo Pontual, Palos Verdes Estates, CA (US); Hanno Basse, Santa Monica, CA (US); Sassan Pejhan, Los Angeles, CA (US); Joseph Santoru, Agoura Hills, CA (US); Ernest C. Chen, San Pedro, CA (US)

(73) Assignee: The DirecTV Group, Inc., El Segundo, CA (US)

( * ) Notice: Subject to any disclaimer, the term of this patent is extended or adjusted under 35 U.S.C. 154(b) by 432 days.

(21) Appl. No.: 13/829,916

(22) Filed: Mar. 14, 2013

(65) Prior Publication Data

US 2014/0140259 A1    May 22, 2014

Related U.S. Application Data

(63) Continuation-in-part of application No. 13/484,756, filed on May 31, 2012, which is a continuation of
(Continued)

(51) Int. Cl.
*H04W 4/06* (2009.01)

(52) U.S. Cl.
CPC ........................................ *H04W 4/06* (2013.01)

(58) Field of Classification Search
CPC ..................................................... H04W 4/06
(Continued)

(56) References Cited

U.S. PATENT DOCUMENTS 4,586,177 A    4/1986   Kaul
4,660,196 A    4/1987   Gray et al.
(Continued)

FOREIGN PATENT DOCUMENTS

EP          0033149 A2    8/1981
WO       2008/113033 A1    9/2008

OTHER PUBLICATIONS

Snyder, Gordon F., Jr.; "Comcast Deploying Upstream Channel Bonding"; Gordon's Information and Communications Technologies (ICT) Blog; Jun. 14, 2011; retrieved from the Internet on May 18, 2012: URL:http://www.gordostuff.com/2011/06/comcast-deploying-upstream-channel.html; whole document.
(Continued)

*Primary Examiner* — Mohamed Kamara
*Assistant Examiner* — Thad Defauw
(74) *Attorney, Agent, or Firm* — Gates & Cooper LLP

(57) ABSTRACT

A method and apparatus for transmitting a plurality of elementary data streams to a plurality of receivers is disclosed. In one embodiment, the method comprises the steps of generating M data streams comprising K multiplexed elementary data streams in a first entity, transmitting the M data streams to a second entity, generating N transmitter streams from the M data streams in the second entity; and transmitting each of the N transmitter streams to the plurality of receivers using an associated one of N broadcast sub-transmitters.

44 Claims, 12 Drawing Sheets

Related U.S. Application Data application No. 11/193,856, filed on Jul. 29, 2005, now Pat. No. 8,200,149.

(58) Field of Classification Search
USPC .......................................................... 370/312
See application file for complete search history.

(56) References Cited

U.S. PATENT DOCUMENTS

| | | | |
|---|---|---|---|
| 4,706,239 A | 11/1987 | Ito et al. | |
| 5,195,092 A | 3/1993 | Wilson et al. | |
| 5,216,503 A | 6/1993 | Paik et al. | |
| 5,319,707 A | 6/1994 | Wasilewski et al. | |
| 5,455,826 A * | 10/1995 | Ozveren | H04L 12/5602 370/232 |
| 5,459,720 A * | 10/1995 | Iliev | H04J 3/1647 370/393 |
| 5,537,435 A | 7/1996 | Carney et al. | |
| 5,648,958 A | 7/1997 | Counterman | |
| 5,691,986 A * | 11/1997 | Pearlstein | H04N 21/23608 358/1.9 |
| 5,818,887 A | 10/1998 | Sexton et al. | |
| 5,835,857 A | 11/1998 | Otten | |
| 5,861,919 A | 1/1999 | Perkins et al. | |
| 5,878,037 A | 3/1999 | Sherman | |
| 5,956,088 A | 9/1999 | Shen et al. | |
| 6,091,455 A | 7/2000 | Yang | |
| 6,108,561 A * | 8/2000 | Mallinckrodt | H04B 7/18558 455/522 |
| 6,181,711 B1 | 1/2001 | Zhang et al. | |
| 6,188,436 B1 | 2/2001 | Williams et al. | |
| 6,212,233 B1 | 4/2001 | Alexandre et al. | |
| 6,215,821 B1 | 4/2001 | Chen | |
| 6,240,072 B1 | 5/2001 | Lo et al. | |
| 6,351,500 B2 | 2/2002 | Kumar | |
| 6,356,539 B1 * | 3/2002 | Zuliani | H04N 7/17309 348/E5.002 |
| 6,377,561 B1 | 4/2002 | Black et al. | |
| 6,539,050 B1 * | 3/2003 | Lee et al. | 375/146 |
| 6,697,364 B1 | 2/2004 | Kekki et al. | |
| 6,771,671 B1 * | 8/2004 | Fields | H04J 3/0685 370/514 |
| 7,058,086 B2 | 6/2006 | Marko | |
| 7,613,233 B2 | 11/2009 | Hottinen | |
| 2001/0001611 A1 | 5/2001 | Yuzawa | |
| 2003/0217362 A1 * | 11/2003 | Summers | H04H 20/42 725/63 |
| 2003/0224731 A1 | 12/2003 | Yamaura et al. | |
| 2003/0236068 A1 | 12/2003 | Jespersen | |
| 2009/0074051 A1 * | 3/2009 | Manapragada | H04L 65/607 375/240 |
| 2014/0070865 A1 * | 3/2014 | Fortier | G06F 1/24 327/296 |

OTHER PUBLICATIONS

Sibley, Mari; "New Details on Comcast Upstream Channel Bonding"; Zatz Not Funny!; Jun. 16, 2011; retrieved from the Internet on May 18, 2012: URL:http://www.zatznotfunny.com/2011-06/new-details-on-comcast-upstream-channel-bonding/; whole document.

Chalasani, Suresh; Varma, Anujan; "Efficient Time-Slot Assignment Algorithms for SS/TDMA Systems with Variable-Bandwidth Beams"; Networking in the Nineties; Bal Harbour, Florida; Apr. 7-11, 1991; [Proceedings of the Annual Joint Conference of the Computer and Communications Societies (INFOCOM)]; New York, New York; IEEE, US; vol. Conference 10; Apr. 7, 1991; pp. 658-667; XP010042453; DOI: 10.1109/INFCOM.1991.147568; ISBN: 978-0-87942-694-1; p. 648, paragraph 2-p. 659, paragraph 2, figure 2.

International Search Report and Written Opinion dated Jul. 28, 2014 in International Application No. PCT/US2014/024659 filed Mar. 12, 2014 by Romulo Pontual et al.

Final Rejection dated May 6, 2013 in U.S. Appl. No. 13/484,756, filed May 31, 2012 by Ernest C. Chen.

* cited by examiner

METHOD AND APPARATUS FOR TRANSMITTING HIGH BANDWIDTH SIGNALS WITH LOW BANDWIDTH TRANSPONDERS

CROSS-REFERENCE TO RELATED APPLICATIONS

This application is a continuation-in-part (CIP) of U.S. patent application Ser. No. 13/484,756, entitled "COMBINING TRANSPONDER BANDWIDTHS FOR SOURCE AND FEC ENCODING EFFICIENCY," by Ernest Chen, filed May 31, 2012, which is a continuation of U.S. application Ser. No. 11/193,856, entitled "COMBINING TRANSPONDER BANDWIDTHS FOR SOURCE AND FEC ENCODING EFFICIENCY," by Ernest Chen, filed Jul. 29, 2005, now issued as U.S. Pat. No. 8,200,149, issued Jun. 12, 2012, all of which applications are hereby incorporated by reference herein.

TECHNICAL FIELD

The present disclosure relates to systems and methods for the spectrally efficient transmission of signals, and more particularly, for combining transponder bandwidths for source and forward error correction encoding efficiency.

BACKGROUND FIELD

Digital Direct Broadcast Systems (DBS) have become very successful. However, as such systems evolve, there is an increasing demand for additional bandwidth and/or more efficient use of existing bandwidth to carry an ever-increasing set of audio, video and data services.

Transmission of video signals over fixed capacity transmission channels poses a number of technical challenges. Raw, uncompressed video requires bandwidth that can exceed the available bandwidth on a satellite channel by orders of magnitude. Video is therefore compressed prior to transmission, using techniques based on standards such as MPEG-2 and MPEG-4|H.264. These techniques can greatly reduce the required bandwidth while maintaining high visual quality. They do result, however, in a compressed bit stream that has a variable bit-rate. This is because the amount of compression achieved greatly depends on the actual content of the video. Scenes with complicated texture or fast moving objects are compressed less and vice versa.

Typical wireless transmission channels, on the other hand, have a fixed transmission rate. To accommodate a variable bit-rate compressed video signal, the fixed wireless channel rate must exceed the peak bit-rate of the video signal. If the peak bit-rate of a compressed video signal exceeds its average bit-rate by a significant amount (usually the case with most types of content) there is a significant waste of the wireless channel capacity. This is typically a precious resource, especially when the wireless transmissions are made via satellite. For example, if the average video bit-rate is 10 mbps and its peak bit-rate is 25 mbps, it would require a satellite channel with a capacity of at least 25 mbps, but on average, 15 mbps, of capacity will be wasted.

To reduce this waste of transmission channel capacity, multiple compressed video signals are usually multiplexed together using a statistical multiplexer (statmux) prior to transmission over the fixed bit-rate satellite channel. Since the peaks in the but rate of one media program signal are unlikely to occur at the same time as the peaks in the bit rate of a signal for another media program, the proportion of the channel capacity needed to account for bit rate variance is reduced. This allows the bit rate of the combined signal to be more closely matched to the channel capacity, thus reducing waste of transmission capacity.

According to the central limit theorem, the variance of the sum of N random variables is the sum of the variance of each random variable. Hence, as N increases to include more random variables, the variability of the sum of those random variables decreases. Considering the instantaneous bit rate of a video stream to be a random variable with a variance and a mean, one would expect the variance of the instantaneous bit rate of N video streams to be a smaller proportion of the average bit rate as the number of video streams goes up.

For example, suppose a signal comprises the sum of five signals, each having an instantaneous bit rate with an average of 10 mbps and a standard deviation of 5 mbps (hence, a variance of 25 mbps). Since there are five such signals, the average bit rate for the combined five signals will be 50 mbps, and the variance of the combined five signals will be 5*25=125 mbps, which equates a standard deviation of about 11.2 mbps. As can be seen from this example, although the average instantaneous but rate quintupled, the standard deviation of that instantaneous bit rate increased by only a little more than a factor of two. Since the channel capacity must accommodate the peak bit rate, combining five such signals reduces the overhead required because the variance of the combined signal is reduced. This is because while one signal may have an instantaneous bit rate well above its average, another signal may have an instantaneous bit rate well below its average, thus allowing transmission of both signals with little or no overhead.

For an even simpler example, consider a signal with five video signals having the above characteristics (10 mbps average bit-rate and a peak bit rate of 25 mbps). If those signals are multiplexed such that the 25 mbps peak bit rate in one signal can be combined with 5 mbps bit rate troughs in two signals and 10 mbps average rate of the other two signals, the total bit rate capacity requirement is 55 mbps (5*10 mbps average rate plus [15−(2*5)] to account for the peaks), which is only 15 mbps (or 30%) more than the sum of the five average bitrates (50 mbps).

In practice, additional bandwidth is required for audio, error correction and transport signaling overhead, but the foregoing simple examples illustrate how statistical multiplexing can reduce the waste associated with transmitting a variable bit-rate compressed video signal over a fixed bit-rate channel such as that of a satellite transponder. This reduced waste can be used to increase channel capacity.

If the capacity of the fixed bit-rate channel is not significantly greater than the average bit-rate of the compressed signals (say at least four or five times), then little will be gained by statistical multiplexing. With the advent of high-bit rate content such as 4KTV, full resolution 3DTV and even 1080p60 content, existing satellite transponders will not have the capacity of transmitting several such streams, even if they are statistically multiplexed together. There is therefore the need to find a solution to maintain the gains of statistically multiplexing several such high bit-rate compressed video signals while at the same time using the existing satellite transmission capabilities.

SUMMARY

Methods and apparatus for transmitting a plurality of elementary data streams to a plurality of receivers are disclosed herein. In one embodiment, the method comprises generating M data streams comprising K multiplexed elementary data streams in a first entity, transmitting the M data streams to a second entity, generating N transmitter streams from the M data streams in the second entity; and transmitting each of the N transmitter streams to the plurality of receivers using an associated on of N broadcast sub-transmitters. In another embodiment, the apparatus comprises a signal distributor, for generating M data streams comprising K multiplexed elementary data streams, and a broadcast transmitter, having N broadcast sub-transmitters. The broadcast transmitter wirelessly receives the M data streams from the signal distributor, generates N broadcast sub-transmitter data streams from the received M data streams, and transmits the N broadcast sub-transmitter data streams via an associated one of the N broadcast sub-transmitters to the plurality of receivers.

Hence, N broadcast sub-transmitters can be used to transmit K multiple video signals that have been statistically multiplexed together and uplinked as M data streams. The statistically multiplexed video signals constitute a "fat pipe" that is then split up and transmitted over multiple "bonded" transponders in a manner that allows reconstitution of the fat pipe at the receiver without loss of data and without increased latency.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments. It is to be understood that other embodiments may be utilized and structural changes may be made without departing from the scope of the present disclosure.

Overview

Transponder bandwidths are combined using a wide-band "virtual" transponder comprising a plurality of narrow-band physical transponders for transmitting a single data stream. A plurality of elementary streams are statistically multiplexed to create the single data stream. The single data stream is forward error correction encoded for channel impairment correction. The single encoded data stream is demultiplexed into a plurality of transponder streams, and each transponder stream is modulated and transmitted to the receivers. Upon receipt from the plurality of narrow-band physical transponders, the transponder streams are demodulated and multiplexed to recover the single data stream. The recovered single data stream is forward error correction decoded and demultiplexed to recover the plurality of elementary streams.

The technique allows for the efficient use of a signal spectrum represented by the transmissions from each transponder. For example, the physical transponders may each use a different portion of a signal spectrum that is non-contiguous with other portions of the signal spectrum. This signal spectrum may include spectrum that was once used for guard bands.

Coding latency is also reduced. The time duration of a forward error correction (FEC) code for a single signal is quite long due to the small symbol rate offered by the single signal. By "pooling" the bandwidths of multiple narrow-band signals (e.g. multiple media programs) for the FEC code, the effective symbol rate is increased, resulting in a significant reduction in code length and therefore code latency. This can be important since more powerful and longer turbo codes are increasingly used in quasi-error free communication.

Transmission System

Figure 1:
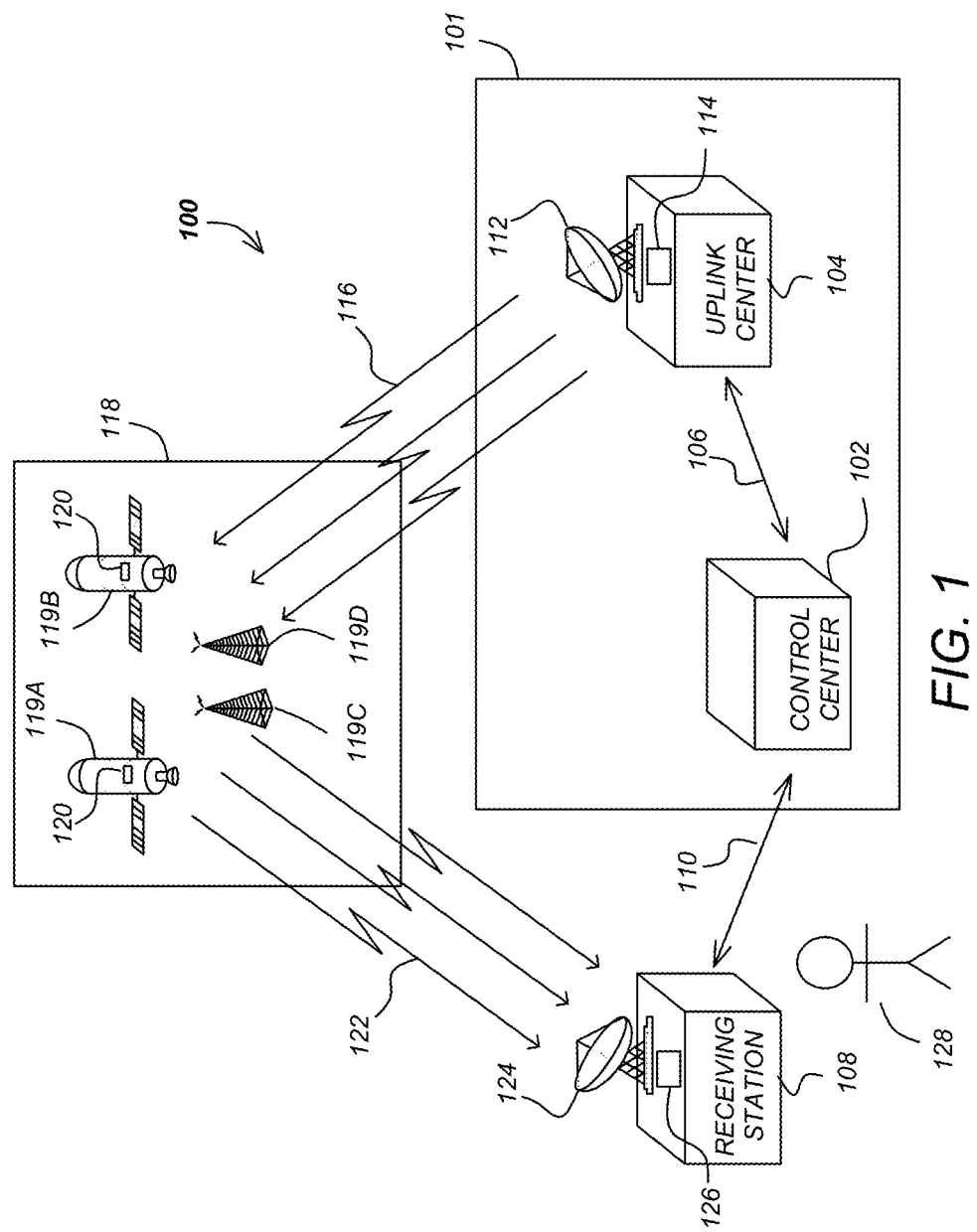
FIG. 1 is a diagram illustrating an exemplary direct broadcast satellite system according to one embodiment of the present disclosure.

FIG. 1 is a diagram illustrating an exemplary transmission system 100 according to one embodiment. The illustrated embodiment includes a signal distributor 101, a broadcast transmitter 118, and a plurality of receiving stations 108. The signal distributor 101 may comprises a control center 102 operated by a service provider in communication with an uplink center 104 via a link 106, and the receiving stations 108 may communicate with the control center 102 via a link 110. The control center 102 provides broadcast materials to the uplink center 104 and coordinates with the receiving stations 108 to offer various services, including key management for encryption and decryption, etc.

The uplink center 104 receives the broadcast materials from the control center 102 and, using an antenna 112 and uplink transmitter 114, transmits the broadcast materials via uplink 116 to the broadcast transmitter 118, which may include one or more broadcast transmitter elements 119A-119D such as satellites and/or terrestrial transmitters, each of which may include one or more broadcast sub-transmitters or transponders 120. The broadcast transmitters 118 receive and process the broadcast materials, and re-transmit the broadcast materials to receiving stations 108 via a downlink 122 using the transmitters/transponders 120. Receiving stations 108 receive the broadcast materials from the broadcast transmitters 118 via an antenna 124, and decrypt and decode the broadcast materials using a receiver 126.

Uplink Configuration

Figure 2:
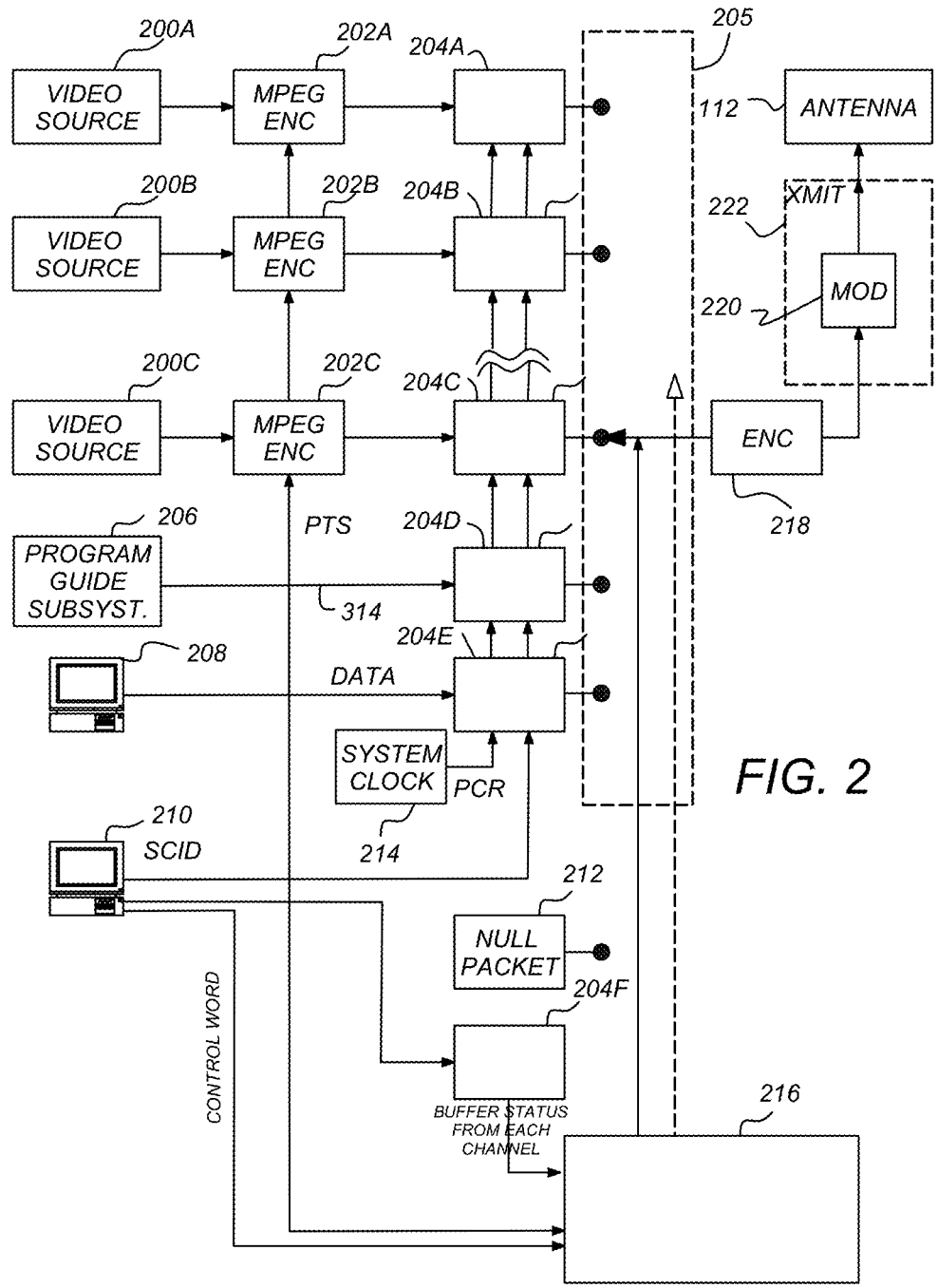
FIG. 2 is a block diagram showing a typical uplink configuration for a single transponder, showing how video program material is uplinked by the control center and the uplink center.

FIG. 2 is a block diagram showing a typical uplink configuration for a single transponder, showing how video program material is uplinked by the control center 102 and the uplink center 104. FIG. 2 shows three video channels (which could be augmented respectively with one or more audio channels for high fidelity music, soundtrack information, or a secondary audio program for transmitting foreign languages), and a data channel from a program guide subsystem 206 and data such as software updates from a data source 208.

The video channels are provided by a program source of video material 200A-200C (collectively referred to hereinafter as video source(s) 200). The data from each video program source 200 is provided to compression encoder 202A-202C (collectively referred to hereinafter as encoder(s) 202). Each of the encoders 202 accepts a program time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment, each encoder 202 may be a second generation Motion Picture experts Group (MPEG-2) encoder, but other encoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A-204F (collectively referred to hereinafter as packetizer(s) 204) associated with each source 200.

The data packets are assembled using a reference from the system clock 214 such as a program clock reference (PCR), and from the conditional access manager 210, which provides the service channel identifier (SCID) to the packetizers 204 for use in generating the data packets. These data packets are then multiplexed by multiplexer 205 into serial data and transmitted. The serial data may be further forward error correction encoded by FEC encoder 218 before transmitted by one or more transmitters 222 having one or more modulators 220 and one or more antennas 112.

Broadcast Data Stream Format and Protocol

Figure 3A:
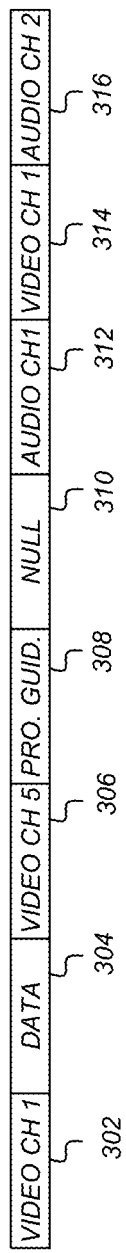
FIG. 3A is a diagram of a representative data stream.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 208. The next packet segment 306 comprises information from video channel 5 (from one of the video program sources 200). The next packet segment 308 comprises program guide information such as the information provided by the program guide subsystem 206. As shown in FIG. 3A, null packets 310 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 126 receives these signals, and using the SCID, reassembles the packets to regenerate the program material for each of the channels.

Figure 3B:
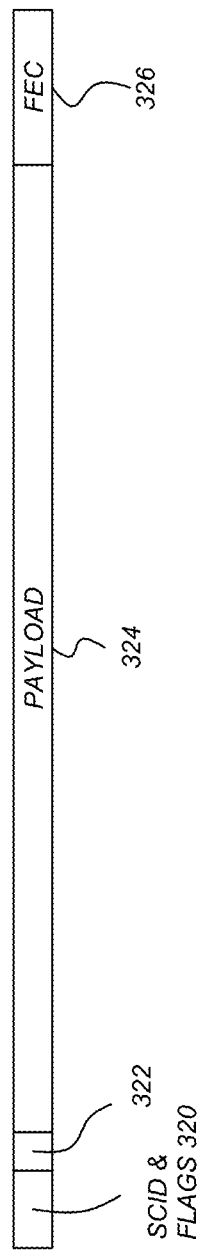
FIG. 3B is a diagram of a data packet.

FIG. 3B is a diagram of one embodiment of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's channel. The flags includes 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 300 or other audio or data sources. The final packet segment 326 is data required to perform forward error correction.

Other data packetization protocols may be used, including protocols used in DVB/DVBS2 or the protocol described in the MPEG-2 Transport Specification as described in ISO/IEC 13818-1 "Systems," 2000, which is hereby incorporated by reference herein.

Signal Transmission

Figure 4:
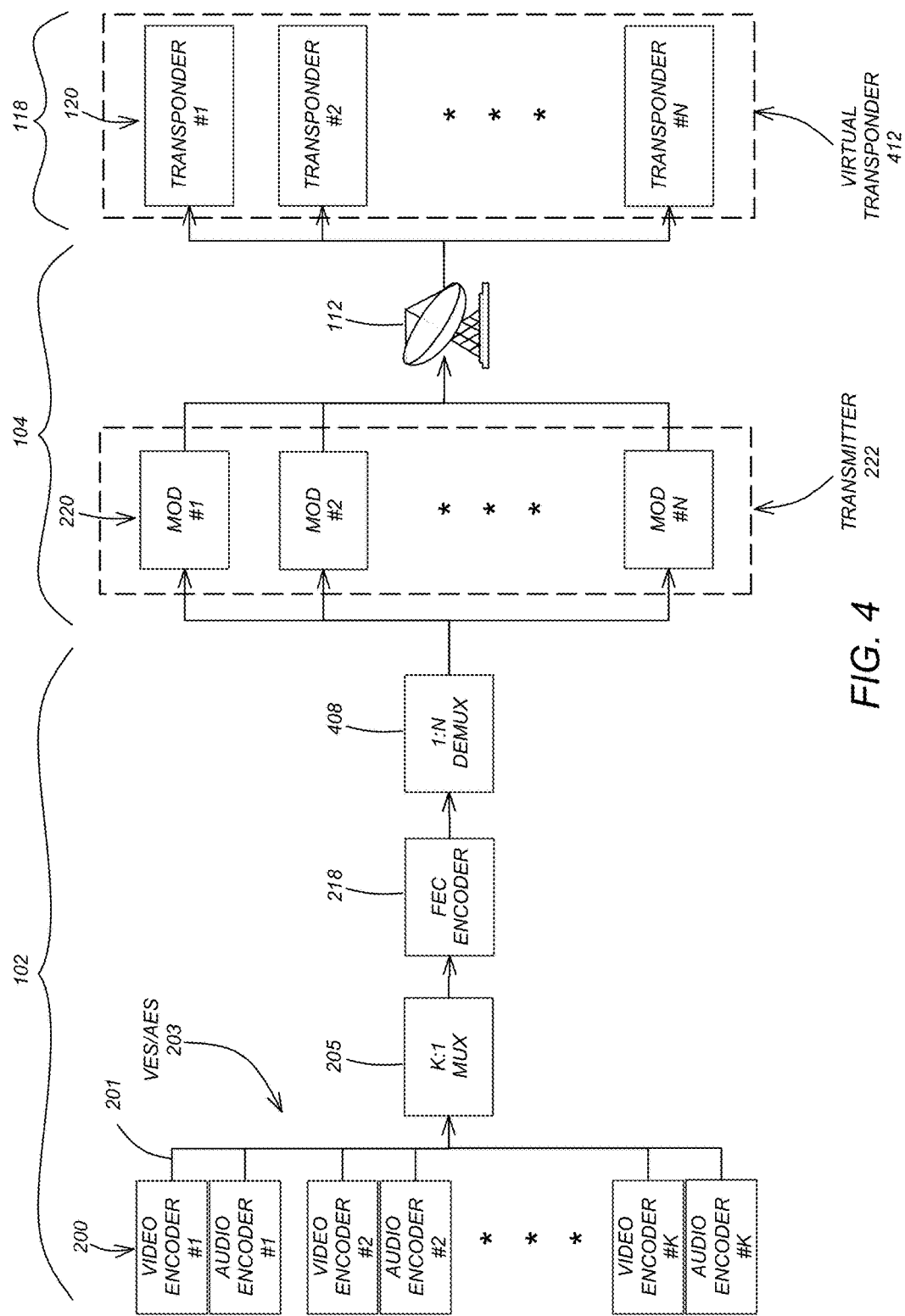
FIG. 4 is a block diagram that further illustrates an exemplary signal transmission system.

FIG. 4 is a block diagram that illustrates further features of an exemplary signal transmission system according to a "bent-pipe" embodiment. In this embodiment, the transmitters 120 comprise transponders that transpond (receive and retransmit) the uplink signal as a downlink signal, with minimal, if any, processing except frequency translation.

The control center 102 includes a plurality (K) of video and/or audio encoders 202 that each encode a video and/or audio source into a video elementary stream (VES) and/or audio elementary stream (AES) 201. The resulting K video and/or audio elementary streams 203 are statistically multiplexed by statistical multiplexer 205, wherein the value K:1 indicates a multiplexing ratio that matches the throughput of the system.

The resulting single data stream may be optionally FEC encoded by FEC encoder 218. After encoding, the single encoded data stream is demultiplexed by demultiplexer 408 into N transponder data streams, wherein the value 1:N indicates a demultiplexing ratio that matches the number of transponders 120 being used.

In the uplink center 104, each of the N transponder data streams is separately modulated by the uplink transmitter 222 having a plurality of modulators 220, and then uplinked via antenna 112 to one or more satellites 118. A plurality N of the transponders 120 on the satellites 118 (where N may comprise all of the transponders 120 or a subset of the transponders 120) are treated as a "virtual" transponder 412, wherein each of the N transponder data streams is routed to a different one of the N transponders 120 for re-transmission. Note that all N transponders 120 do not have to be of the same bandwidth, and together they may carry a combination of legacy and guard-band signals as may be desired.

In one embodiment, the number of transponders N used to transmit the K multiplexed elementary data streams is determined such that although the bit rate of the single stream from the multiplexer 205 may exceed the bit rate of any one of the N physical transponders, it does not exceed the combined bit rate of the N physical transponders. For example, if each of the K multiplexed elementary data streams has an associated temporally varying peak bit rate of $BRD_1(t), BRD_2(t), \ldots, BRD_K(t)$, the single intermediate data stream will have a peak bit rate of:

$$BRS(t) \geq \sum_{i=1}^{K} BRD_i(t).$$

Note that the single intermediate data stream will have a bit rate at least equal to the sum of the bit rates of the elementary data streams, and might be greater because of the addition of null packets. However, since it is unlikely that the peak bit rates of each elementary stream will temporally coincide, the single intermediate data stream will ordinarily have a peak bit rate of less than the sum of the peak bit rates for each of the K elementary data streams. This reduction is known as the statmux gain.

Further, if each of the N physical transmitters has an associated maximum bit transmission rate of $BRT_1$, $BRT_2, \ldots, BRT_N$, the number of transponders N to transmit the K elementary streams can be selected such that $$\sum_{i=1}^{N-1} BRT_i < BRS(t) \leq \sum_{i=1}^{N} BRT_i$$

for all time t. In cases where the N transponders 120 have different maximum bit transmission rates, the sum of the maximum bit transmission rates for the transponders 120 selected for use must exceed the bit rate of the single intermediate data stream.

Signal Reception

Figure 5:
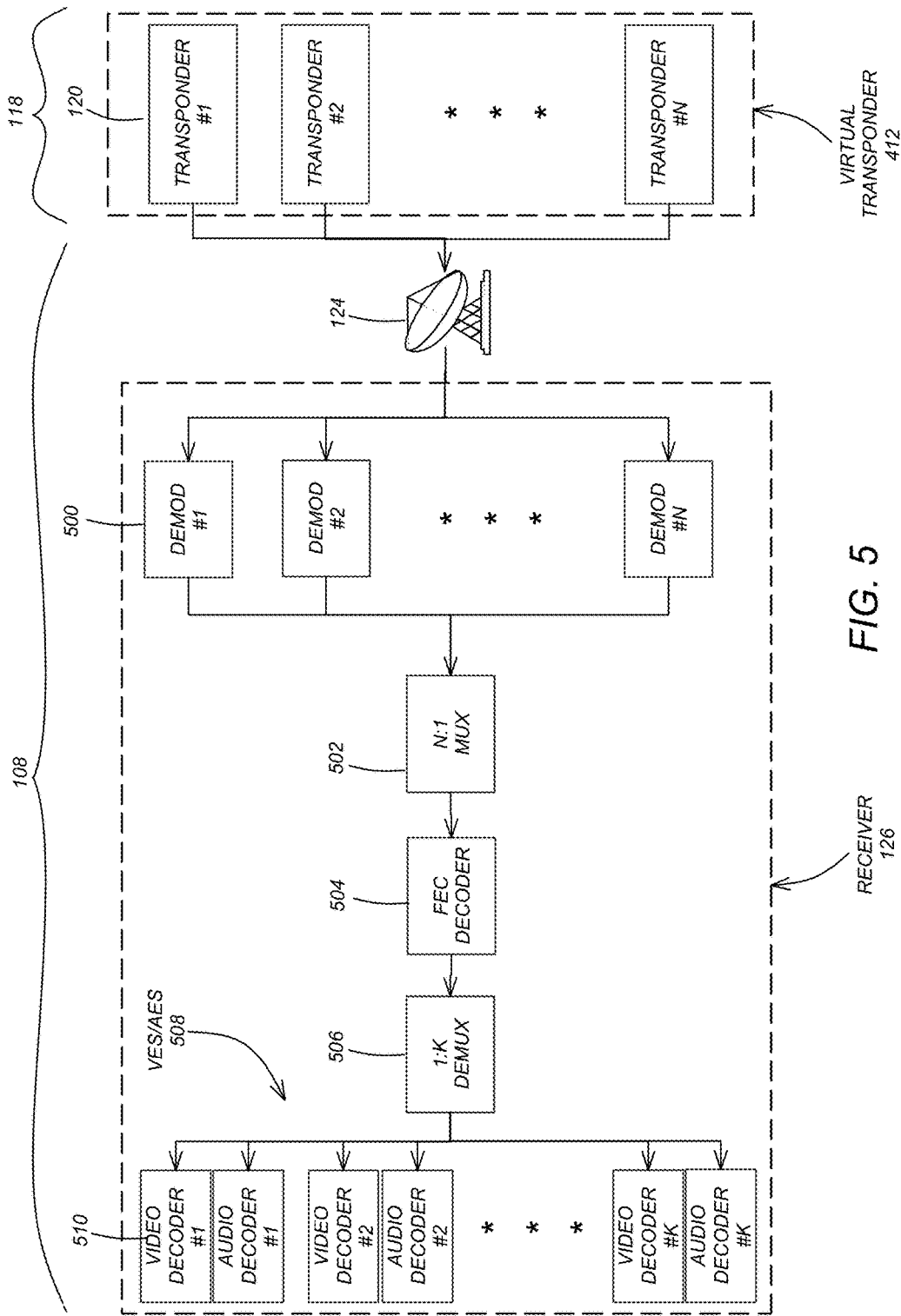
FIG. 5 is a block diagram that further illustrates art exemplary signal reception system.

FIG. 5 is a block diagram that further illustrates an exemplary signal reception system. As in FIG. 4, a plurality N of the transponders 120 on the broadcast transmitter 118 (where N may comprise all of the transponders 120 or a subset of the transponders 120) are treated as a "virtual" transponder 412, wherein each of the N transponder data streams is routed to a different one of the N transponders 120 for re-transmission. At the receiving stations 108, each of the N transponder data streams is downlinked from the broadcast transmitter 118 via antenna 124 and receiver 126. In the receiver 126, each of the N transponder data streams is separately demodulated using demodulators 500. After demodulation, the N transponder data streams are properly time-aligned and multiplexed by multiplexer 502 to recover the single encoded data stream.

This time alignment can be performed using time reference information such as the PTS described above, or equivalent time stamps found in an MPEG data stream such as the reference time stamp or program time stamp. For example, the received data can be temporarily stored and retrieved, and sorted before presentation according to the time reference information.

The single encoded data stream is then optionally FEC decoded by decoder 504. The resulting single data stream is demultiplexed by demultiplexer 506 to recover the K plurality of video and/or audio elementary streams 508. Each of the K video and/or audio elementary stream 508 are decoded by one of a plurality K of video and/or audio decoders 510 to complete the signal reception.

The foregoing illustrates an embodiment in which the K data streams 201 are multiplexed together into a single data stream, and encoding is performed on that single data stream. Further, the signals from each transponder are multiplexed together into a single data stream that is FEC decoded before demultiplexing the stream to recover the K data streams 508. As described herein this increases the efficiency of the FEC encoding and decoding processes, as it provides a longer stream to the FEC encoder 218 and decoder 504.

Alternatively, the FEC encoding can be performed separately on each portion of the data stream after demultiplexing by demultiplexer 408, for example by using an FEC encoder incorporated into each of the modulators 220 and a decoder incorporated into each demodulator 500.

Set Top Box

Figure 6:
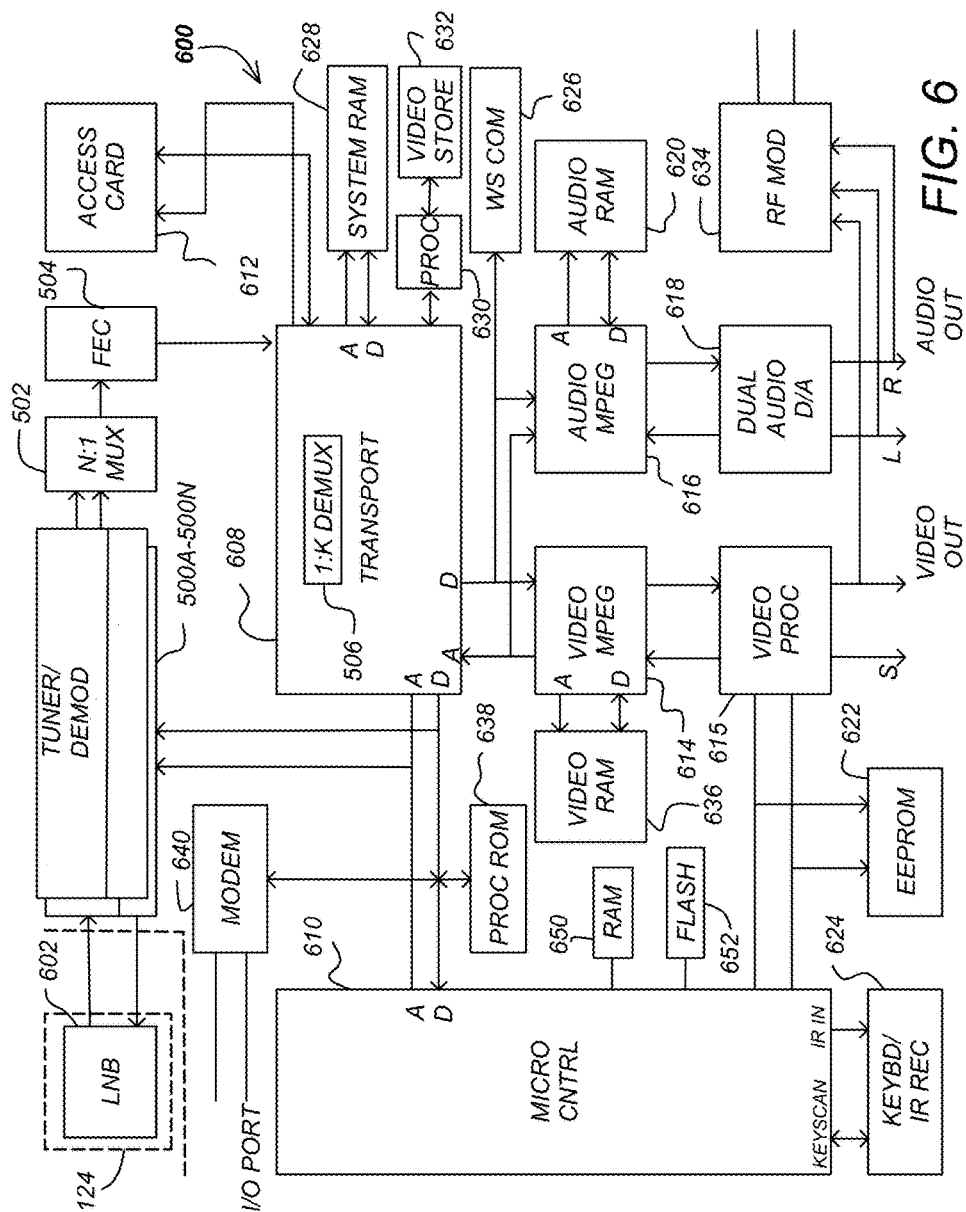
FIG. 6 is a block diagram of showing additional details of an exemplary receiver.

FIG. 6 is a block diagram showing additional details of an exemplary receiver 126. The receiver 126 comprises one or more tuner/demodulator(s) 500A-500N communicatively coupled to an outdoor unit (ODU) coupled to antenna 124 having one or more Low Noise block (LNB) downconverters 602. The LNB 602 converts downlink signal 122 from the broadcast resource 118 to a signal required by the receiver's 126 tuner/demodulators 500A-500N. The LNB 602 may provide either a dual or a single output. The single-output LNB 602 has only one RF connector, while a multiple output LNB 602 has multiple RF output connectors and can be used to feed a another tuner/demodulator 500, a second receiver 126 or some other form of distribution system.

Each tuner/demodulator 500 isolates a single broadcast sub-transmitter/transponder 120, and converts the modulated data to a digital data stream. As packets are received, each tuner/demodulator 500 identifies the type of each packet. If the tuner/demodulator 500 identifies a packet as program guide data, the tuner/demodulator 500 outputs the packet to memory. The digital data streams are then provided to multiplexer 502 and then to a forward error correction (FEC) decoder 504. This allows the receiver 126 to reassemble the data transmitted by the uplink center 104 (which applied the forward error correction to the desired signal before transmission to the subscriber receiving station 108) verifying that the correct data signal was received and correcting errors, if any. The error-corrected data may be fed from the FEC decoder module 504 to the transport module 608, e.g. via an 8-bit parallel interface.

The transport module 608 performs many of the data processing functions performed by the receiver 126. The transport module 608 processes data received from the FEC decoder module 504 and provides the processed data to the video MPEG decoder 614, the audio MPEG decoder 616, and the microcontroller 610 and/or data storage processor 630 for further data manipulation. In one embodiment, the transport module, video MPEG decoder and audio MPEG decoder are all implemented on integrated circuits. This design promotes both space and power efficiency, and increases the security of the functions performed within the transport module 608. The transport module 608 may also perform the operations 1:K demultiplexing operations described above, or those operations may be performed external to the transport module 608.

The transport module 608 also provides a passage for communications between the microprocessor 610 and the video and audio MPEG decoders 614, 616. As set forth more fully hereinafter, the transport module also works with the conditional access module (CAM) 612 to determine whether the subscriber receiving station 108 is permitted to access certain program material. Data from the transport module can also be supplied to external communication module 626.

The CAM 612 functions in association with other elements to decode an encrypted signal from the transport module 608. The CAM 612 may also be used for tracking and billing these services. In one embodiment, the CAM 612 is a smart card, having contacts cooperatively interacting with contacts in the receiver 126 to pass information. In order to implement the processing performed in the CAM 612, the receiver 126, and specifically the transport module 608 provides a clock signal to the CAM 612.

Video data is processed by the MPEG video decoder 614. Using the video random access memory (RAM) 636, the MPEG video decoder 614 decodes the compressed video data and sends it to an encoder or video processor 615, which converts the digital video information received from the video MPEG module 614 into an output signal usable by a display or other output device. By way of example, processor 615 may comprise a National TV Standards Committee (NTSC) or Advanced Television Systems Committee (ATSC) encoder. In one embodiment, S-Video, baseband video and RF modulated video (NTSC or ATSC) signals are provided. Other outputs may also be utilized, and are advantageous if ATSC high definition programming is processed.

Audio data is likewise decoded by the MPEG audio decoder 616. The decoded audio data may then be sent to a digital to analog (D/A) converter 618. In one embodiment, the D/A converter 618 is a dual D/A converter, one for the right and left channels. If desired, additional channels can be added for use in surround sound processing or secondary audio programs (SAPs). In one embodiment, the dual D/A converter 618 itself may separate the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 610 receives and processes command signals from the remote control 624, a receiver keyboard interface, modem 640, and transport 608. The microcontroller receives commands for performing its operations from a processor programming memory, which permanently stores such instructions for performing such commands. The memory used to store data for microprocessor 610 and/or transport 608 operations may comprise a read only memory (ROM) 638, an electrically erasable programmable read only memory (EEPROM) 622, a flash memory 652 and/or a random access memory 650, and/or similar memory devices. The microprocessor 610 also controls the other digital devices of the receiver 126 via address and data lines (denoted "A" and "D" respectively, in FIG. 6).

The modem 640 connects to the customer's phone line via the PSTN port 120. It calls, e.g. the program provider, and transmits the customer's purchase information for billing purposes, and/or other information. The modem 640 is controlled by the microprocessor 610. The modem 640 can output data to other I/O port types including standard parallel and serial computer I/O ports. Data can also be obtained from a cable or digital subscriber line (DSL) modem, or any other suitable source.

The receiver 126 may also comprise a local storage unit such as the storage device 632 for storing video and/or audio and/or other data obtained from the transport module 608. Video storage device 632 can be a hard disk drive, a read/writable compact disc or DVD, a solid state RAM, or any other storage medium. In one embodiment, the video storage device 632 is a hard disk drive with specialized parallel read/write capability so that data may be read from the video storage device 632 and written to the device 632 at the same time. To accomplish this, additional buffer memory accessible by the video storage 632 or its controller may be used. Optionally, a video storage processor 630 can be used to manage the storage and retrieval of the video, audio, and/or other data from the storage device 632. The video storage processor 630 may also comprise memory for buffering data passing into and out of the video storage device 632. Alternatively or in combination with the foregoing, a plurality of video storage devices 632 can be used. Also alternatively or in combination with the foregoing, the microprocessor 610 can also perform the operations required to store and or retrieve video and other data in the video storage device 632.

The video processing module 615 output can be directly supplied as a video output to a viewing device such as a video or computer monitor. In addition the video and/or audio outputs can be supplied to an RF modulator 634 to produce an RF output and/or 8 vestigial side band (VSB) suitable as an input signal to a conventional television tuner. This allows the receiver 126 to operate with televisions without a video input.

Each of the broadcast resource elements 119 comprises one or more transponders, each of which accepts program information from the uplink center 104, and relays this information to the subscriber receiving station 108. Known multiplexing techniques are used so that multiple channels can be provided to the user. These multiplexing techniques include, by way of example, various statistical or other time domain multiplexing techniques and polarization multiplexing. In one embodiment, a single transponder operating at a single frequency band carries a plurality of channels, each identified by a respective service channel identifier (SCID).

Preferably, the receiver 126 also receives and stores a program guide in a memory available to the microprocessor 610. Typically, the program guide is received in one or more data packets in the data stream from the broadcast resource 118. The program guide can be accessed and searched by the execution of suitable operation steps implemented by the microcontroller 610 and stored in the processor ROM 638. The program guide may include data to map viewer channel numbers to satellite networks, satellite transponders and service channel identifications (SCIDs), and also provide TV program listing information to the subscriber identifying program events.

Initially, as data enters the receiver 126, the tuner/demodulator 500 looks for a boot object. Boot objects are always transmitted with the same SCID number, so tuner 500 knows that it must look for packets marked with that identification number. A boot object identifies the identification numbers where all other objects can be found.

As data is received and stored in the memory, the microprocessor 610 acts as a control device and performs various operations on the data in preparation for processing the received data. These operations include packet assembly, object assembly and object processing.

The first operation performed on data objects stored in the memory 650 is packet assembly. During the packet assembly operation, microprocessor 610 examines the stored data and determines the locations of the packet boundaries.

The next step performed by microprocessor 610 is object assembly. During the object assembly step, microprocessor 610 combines packets to create object frames, and then combines the object frames to create objects. Microprocessor 610 examines the checksum transmitted within each object frame, and verifies whether the frame data was accurately received. If the object frame was not accurately received, it is discarded from memory 650. Also during the object assembly step, the microprocessor 610 discards assembled objects that are of an object type that the microprocessor 610 does not recognize. The receiver 126 maintains a list of known object types in memory 650. The microprocessor 610 examines the object header of each received object to determine the object type, and the microprocessor 610 compares the object type of each received object to the list of known object types stored in memory 650. If the object type of an object is not found in the list of known object types, the object is discarded from memory 650. Similarly, the receiver 126 maintains a list of known descriptor types in memory 650, and discards any received descriptors that are of a type not in the list of known descriptor types.

The last step performed by microprocessor 610 on received object data is object processing. During object processing, the objects stored in the memory 650 are combined to create a digital image. Instructions within the objects direct microprocessor 610 to incorporate other objects or create accessible user-links. Some or all of the digital images can be later converted to an analog signal that is sent by the receiver 126 to a television or other display device for display to a user.

The functionality implemented in the receiver 126 depicted in FIG. 6 can be implemented by one or more hardware modules, one or more software modules defining instructions performed by a processor, or a combination of both.

Spectrum Example

An advantage of the disclosed system is that it allows efficient use of a fragmented signal spectrum, such as from non-contiguous guard bands. Consider the example shown in FIG. 7, which illustrates the insertion of guard band signals 700 between legacy band signals 702. In this example, the rate ration between the legacy band 702 and the guard band 700 is approximately 4:1. To use these guard bands 700, the N transponder data streams described in FIGS. 2 and 3 are transmitted by the N transponders 120 in N guard bands. Alternatively, the N transponder data streams described in FIGS. 2 and 3 are transmitted by the N transponders 120 in a combination of N legacy bands and guard bands.

Figure 8:
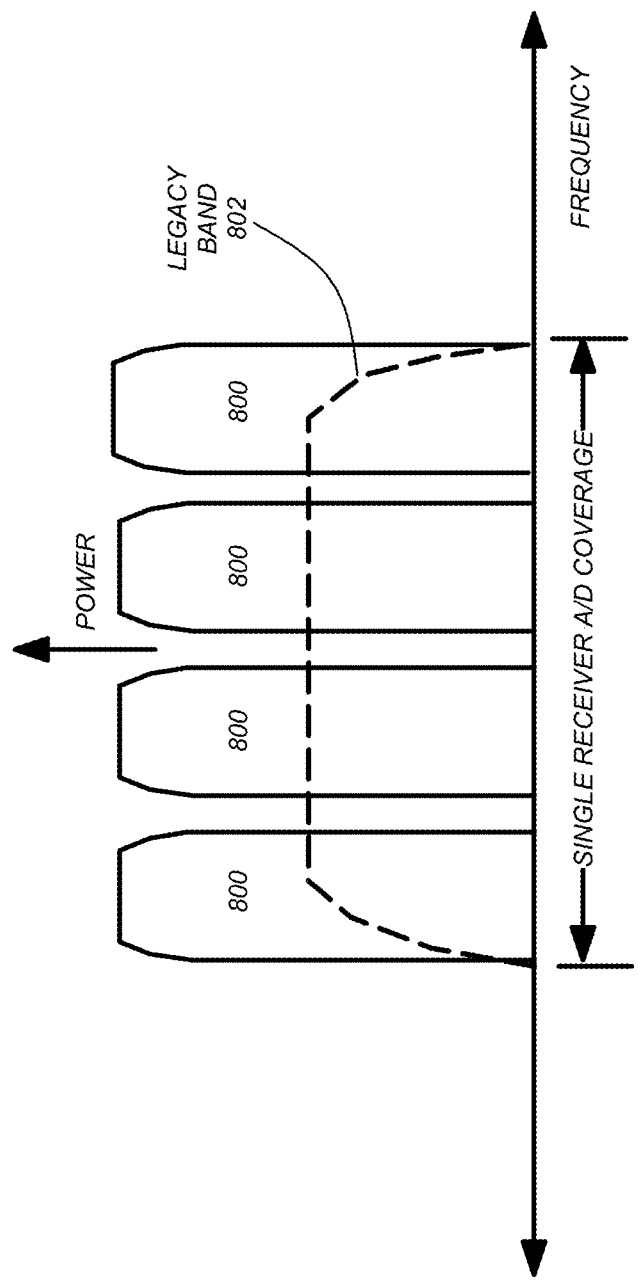
FIG. 8 illustrates the construction of high spectral-efficiency signals according to an embodiment.

Another advantage of this system is that it allows narrow-band transponders 120 to simultaneously achieve high CNR and statistical-multiplexing efficiencies. Consider the example shown in FIG. 8, which illustrates the construction of high spectral-efficiency signals 800 in the legacy band 802. For high-throughput communication, spectral efficiency dictates a CNR that may be beyond current satellite TWTA (traveling-wave-tube amplifier) power availability. For a given TWTA power, reducing the signal bandwidth can increase the CNR enough to meet the requirement. Multiple transponders 120, properly configured and spaced in the frequency domain in this way, can cover the entire signal bandwidth of interest. While each narrow-bandwidth signal might not support good statistical-multiplexing efficiency, the combined signal may do so.

Yet another advantage is that reduced FEC code latency. The combined bandwidth provided by the present system increases the effective symbol rate, thereby resulting in a shortened time duration of a given FEC.

Other Considerations

The communications system described herein is assumed to operate with a constant-envelope signal on all transponders 120. Typically, a single-carrier QPSK or 8PSK signal is used to maximize TWTA power efficiency. Either single-channel or multiple-channel receivers 126 may be used.

Figure 7:
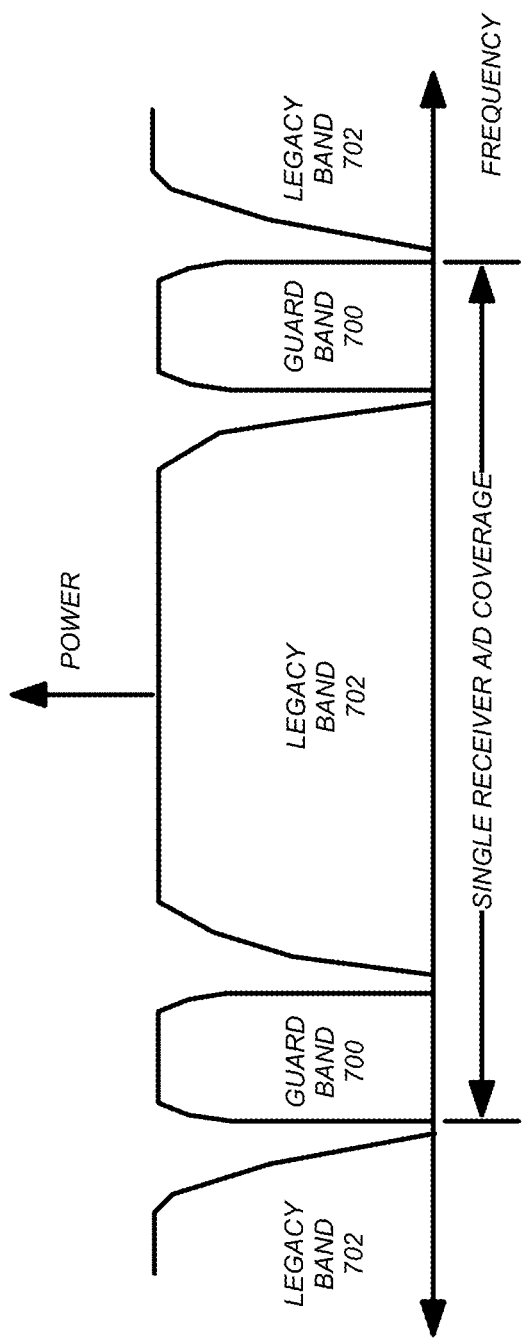
FIG. 7 illustrates the insertion of guard-band signals between legacy band signals.

In a single-channel receiver 126 design, a single tuner with a fast, single-set, analog-to-digital (A/D) converter covers several transponder 120 signals that comprise a part or all of the virtual transponder 412. For example, if two guard bands 700 on either side of a legacy signal band 702 in FIG. 7 are to be combined, then the A/D converter of the receiver 126 must cover the bandwidth depicted in FIG. 7. After A/D conversion, digital filtering in the receiver 126 would be used to select the two guard bands 700, demodulating the signals to extract relevant information for further processing.

Alternatively, a multiple channel receiver 126 design may include a tuner and A/D converter for each physical transponder 120. Compared with a single-tuner receiver 126, the tuners and A/Ds in this embodiment are replicated in the receiver 126, but the A/Ds can be slower, as they only need to cover a narrow-band signal from one of the transponders 120.

Additional Embodiments

In the above description, it is assumed that the bit-rates, bandwidth, or channel capacity of the uplink and downlink signals 116 and 122 are the same. In this case, the satellite 118 transponders 120 simply receive and retransmit (possibly with frequency shifting) the uplink signals 116. Hence, the broadcast transmitter 118 can be modeled as Essentially a plurality of remote transponders. However, the uplink and downlink bandwidths Need not be identical. A more generalized transmission system 100 may utilize m uplink Signals 116 and N downlink signals 122.

For example, a single uplink signal 116 may be able to accommodate an entire multiplexed stream (M=1), but a single downlink signal 122 may not be able to accommodate the entire stream, thus requiring a plurality of downlink signals 122 (N≥2). Similarly, multiple uplink signals 116 may be required (M≥1), but a single downlink signal 122 (N=1) may be able to accommodate the entire multiplexed stream.

Figure 9:
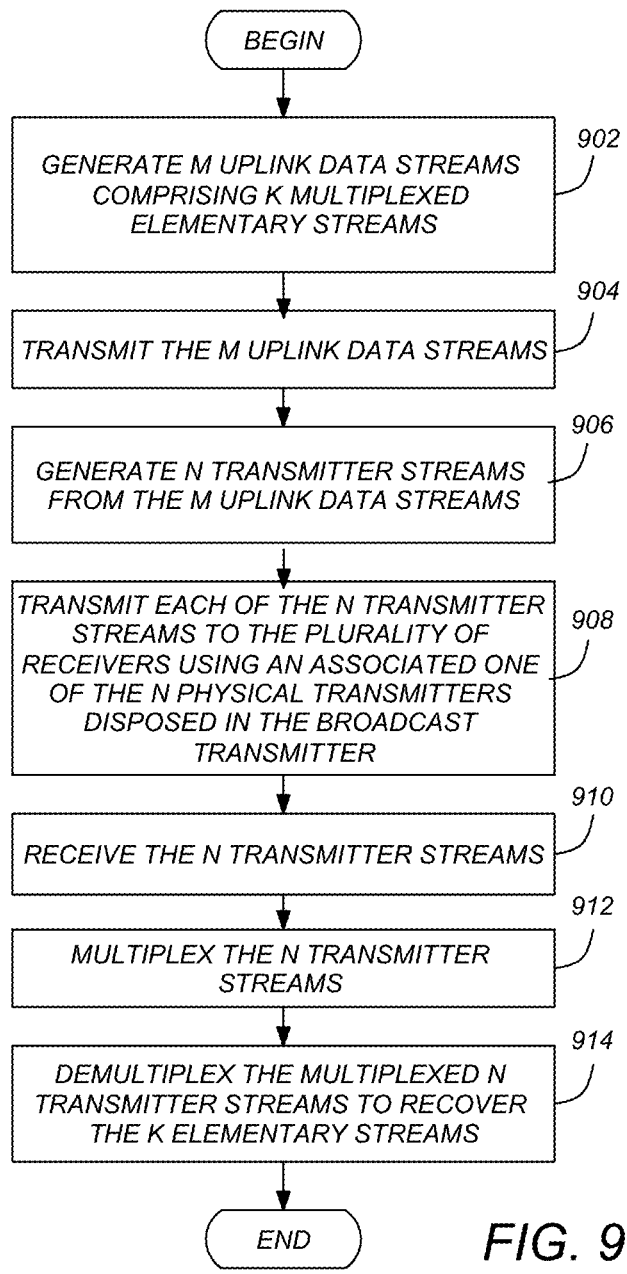
FIG. 9 is a diagram illustrating an exemplary method that can be used to transmit media programs and other data using a generalized transmission system in which the number of uplink data streams M need not be equal to the number of downlink transmitter streams N.
Figure 10:
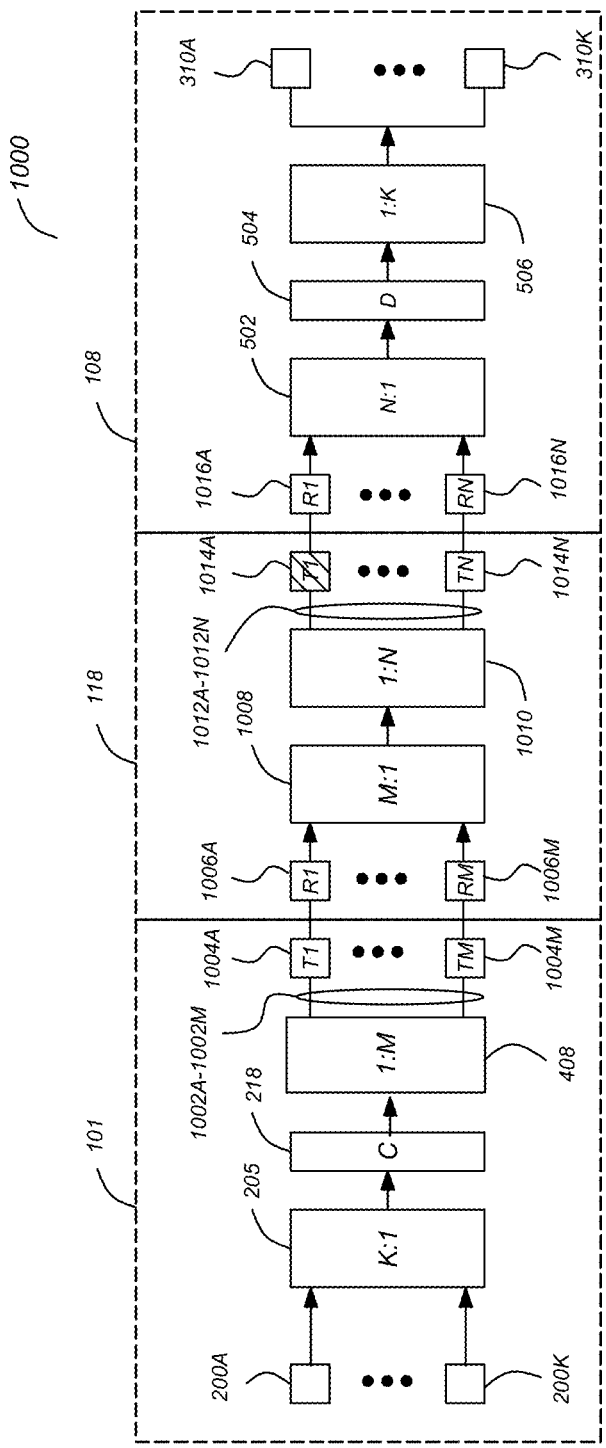
FIG. 10 is a diagram illustrating an exemplary embodiment of the generalized transmission system.

FIG. 9 is a diagram illustrating an exemplary method that can be used to transmit media programs and other data using a generalized transmission system in which the number of uplink data streams M need not be equal to the number of downlink transmitter streams N. FIG. 10 is a diagram illustrating an exemplary embodiment of the generalized transmission system 1000.

Turning first to FIG. 9, M data streams 1002A-1002M that comprise k multiplexed elementary data streams are generated, as shown in block 902. This can be performed, for example, by the signal distributor 101, which may perform the functions described with respect to the control center 102 and the uplink center 104 described above in connection with the bent-pipe transmission system 100. As shown in FIG. 10, this may be accomplished by statistically multiplexing the K elementary data streams with a statistical multiplexer 205 to generate a single intermediate data stream, then demultiplexing the single intermediate data stream into M data streams 1010 using demultiplexer 408. The intermediate data stream may also be optionally coded (for example, error correction coded) by encoder 218 before application to the demultiplexer 408.

Returning again to FIG. 9, the M data streams 1002A-1002M axe transmitted to a broadcast transmitter 118, which may comprise one or more of the satellites or terrestrial transmitters shown in FIG. 1. This is illustrated in block 904. This can be accomplished by uplink transmitter 222 separately modulating each of the M data streams or by M separate uplink sub-transmitters 1004A-1004M as shown in FIG. 10.

The broadcast transmitter 118 receives the M data streams and generates N transmitter streams 1012A-1012N from the received M data streams, as shown in block 906. In the illustrated embodiment, this is accomplished by providing each of the received M modulated data streams to a receiver 1006A-1006M associated with each of the M data streams (or one of a plurality of demodulators in a single receiver), and applying those M data streams to a recombiner or multiplexer 1008 to produce a recombined data stream. The recombined data stream is then split or demultiplexed into N data streams using splitter or demultiplexer 1010 to produce the N transmitter streams 1012A-1012N. The functions of the multiplexer 1008 and demultiplexer 1010 may be combined into a single device which performs the transformation of M data streams to N data streams.

The N transmitter streams 1012A-1012N are then transmitted to one or more of the receiver station(s) 108 with each of the N transmitter streams being transmitted by an associated one of N physical broadcast sub-transmitters 1014A-1014N. In one embodiment, each of the N transmitter streams is associated with only one of the N physical broadcast sub-transmitters 1014A-1014N.

The N transmitter streams 1012A-1012N are received at the receiver station 108, multiplexed to form a single stream, and the single stream is demultiplexed to recover the K elementary data streams, as shown in blocks 910-914. In one embodiment, this is accomplished by receiving the signals from the N physical transmitters 1014A-1014N using a receiver 1016A-1016N associated with one of the N transmitter streams 1012A-1012N, or a single receiver having a plurality of demodulators, each associated with one of the N transmitter streams 1012A-1012N, and applying the received N transmitter streams 1012A-1012N to a multiplexer 502 to generate a single data stream. That single data stream may optionally be decoded (for example, FEC decoded) by decoder 504 before being applied to multiplexer 506. The multiplexer 506 recovers one or more of the K elementary data streams.

In one embodiment of the generalized transmission system 1000, the number of uplink data streams is the same as the number of downlink data streams (M=N). In this embodiment, the broadcast transmitter 118 may operate analogously to the bent-pipe system 100 shown in FIG. 1, wherein the K elementary data streams are formed into 5 transponder streams that are transmitted to a broadcast transmitter 118. In this case, the broadcast transmitter 118 does not require the splitter 1008 or recombiner 1010, and the transmitters 1014A-1014N may comprise simple transponders.

In another embodiment, the K elementary data streams can be multiplexed into a single data stream that is transmitted to the broadcast transmitter 118 using a single uplink signal 116 (M=1). In this embodiment, the demultiplexer 408 is not required and only one of the transmitter 1004 are required to uplink the signal to the broadcast transmitter 118. The broadcast transmitter 118 generated the N transmitter streams 1012A-1012N from the received single data stream using splitter or demultiplexer 1010, and transmits the N transmitter streams 1012A-1012N to the receiver station(s) 108 via transmitter 1014A-1014N. Thus, only one receiver 1006A is required, and multiplexer 1008 is not required.

In another possible embodiment, a plurality of uplink data streams 116 are used to provide the K elementary data streams to the broadcast transmitter 118, but only one transmitter (e.g. 1014A) is used to transmit those K elementary data streams to the receiver station(s). In this embodiment, M≥2 and N=1, and transmitter 1014B-1014N, receivers 1016B-1016N are not required.

In yet another possible embodiment, there is more than one uplink data stream 116 (M≥2) and more than one downlink data stream 122 (N≥2), and the number of uplink data streams 116 and downlink data streams 122 are not equal (M≠N). In this instance, the demultiplexer 408, transmitters 1004, receivers 1006, multiplexer or recombiner 1008, splitter or demultiplexer 1010, transmitters 1014, receivers 1016 and multiplexer 502 are implemented to transmit and recover the K elementary data streams.

In one embodiment, the broadcast transmitter 118 takes advantage of FEC decoding and encoding wherever the signal is demodulated. In which case, if the received signal is FEC encoded, it is decoded in the broadcast transmitter recombined as desired and FEC encoded again before transmission to the receiver stations 108.

Figure 11:
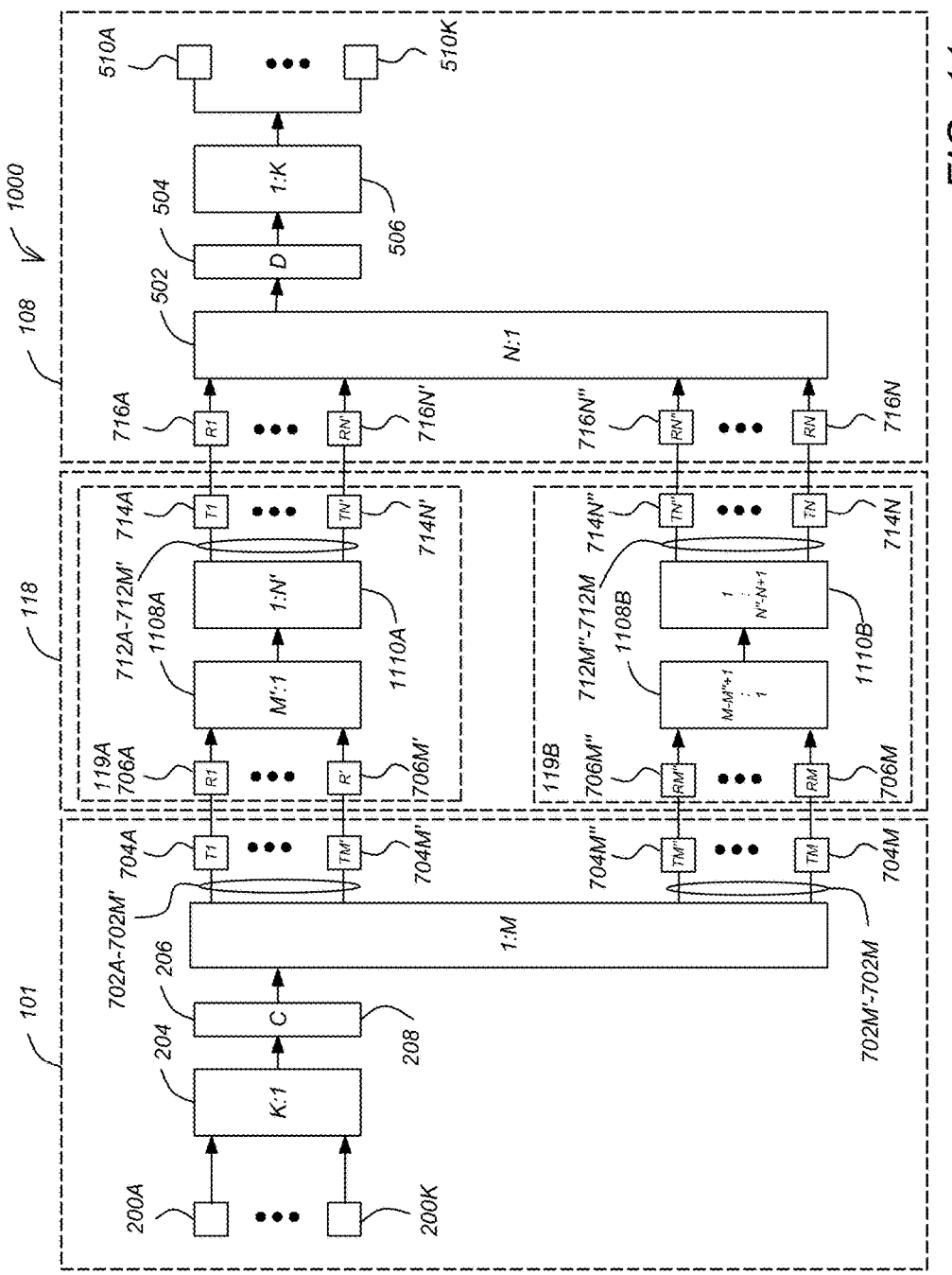
FIG. 11 is a diagram illustrating another embodiment of the generalized transmission system, in which the M data streams are transmitted to two broadcast transmitter elements.

FIG. 11 is a diagram illustrating another embodiment of the generalized transmission system 1000. In this embodiment, the broadcast transmitter 118 comprises a plurality of broadcast transmitter elements 119A-D (e.g. multiple satellites, multiple terrestrial transmitters, or a combination thereof). In this embodiment, a first subset of the M uplink data signals 702A-702M' are transmitted to one of the broadcast transmitter elements 119A using a first subset of the uplink sub-transmitters 704-704M' and a second subset of the M uplink data signals 702M"-702M are transmitted to another of the broadcast transmitter elements 119B using a second subset of the uplink sub-transmitters 704M"-704M. Broadcast transmitter element 119A includes receivers 706A-706M' to receive the first subset of M uplink data signals 702A-702M', and a multiplexer or recombiner 1108A that recombines the M' data signals to produce a single data stream. The single data stream is demultiplexed by splitter or demultiplexer 1110A into N' broadcast sub-transmitter streams, which are provided to N' broadcast sub-transmitter 714A-714N' for transmission to the receiver stations 108. Similarly, broadcast transmitter element 119B includes receivers 706M"-706M to receive the first subset of M uplink data signals 702M"-702M, and a multiplexer or recombiner 1108B that recombines the M"-M+1 data signals to produce a single data stream. The single data stream is demultiplexed by splitter or demultiplexer 1110B into N-N'+1 broadcast sub-transmitter streams, which are provided to N'+1 broadcast sub-transmitters 714N''-714N for transmission to the plurality of receiver stations 108.

The receiving stations 108 receive the N broadcast sub-transmitter streams and provide them to the multiplexer 502. The multiplexer 502 multiplexes the N sub-transmitter streams into a single stream, which is optionally decoded by the decoder 504 before being demultiplexed into the K elementary streams. Thus, a first subset of the M uplink data streams 702A-702M' is transmitted in the broadcast transmitter element 119A and these M uplink data streams are transformed in the broadcast transmitter element 119A into N' broadcast sub-transmitter streams that are transmitted to the receiver stations 108. Similarly, a second subset of the M uplink data streams 702M''-702M is transmitted to another broadcast transmitter element 119B and these M uplink data streams are transformed in the broadcast transmitter element 119B into N-N'+1 broadcast sub-transmitter streams that are transmitted to the receiver stations 108. The receiver stations 108 receive the N sub-transmitter streams, multiplex and time-align the streams from the first broadcast transmitter element 119A and the second broadcast transmitter element 119B as described above to assemble the K elementary streams.

Hardware Environment

Figure 12:
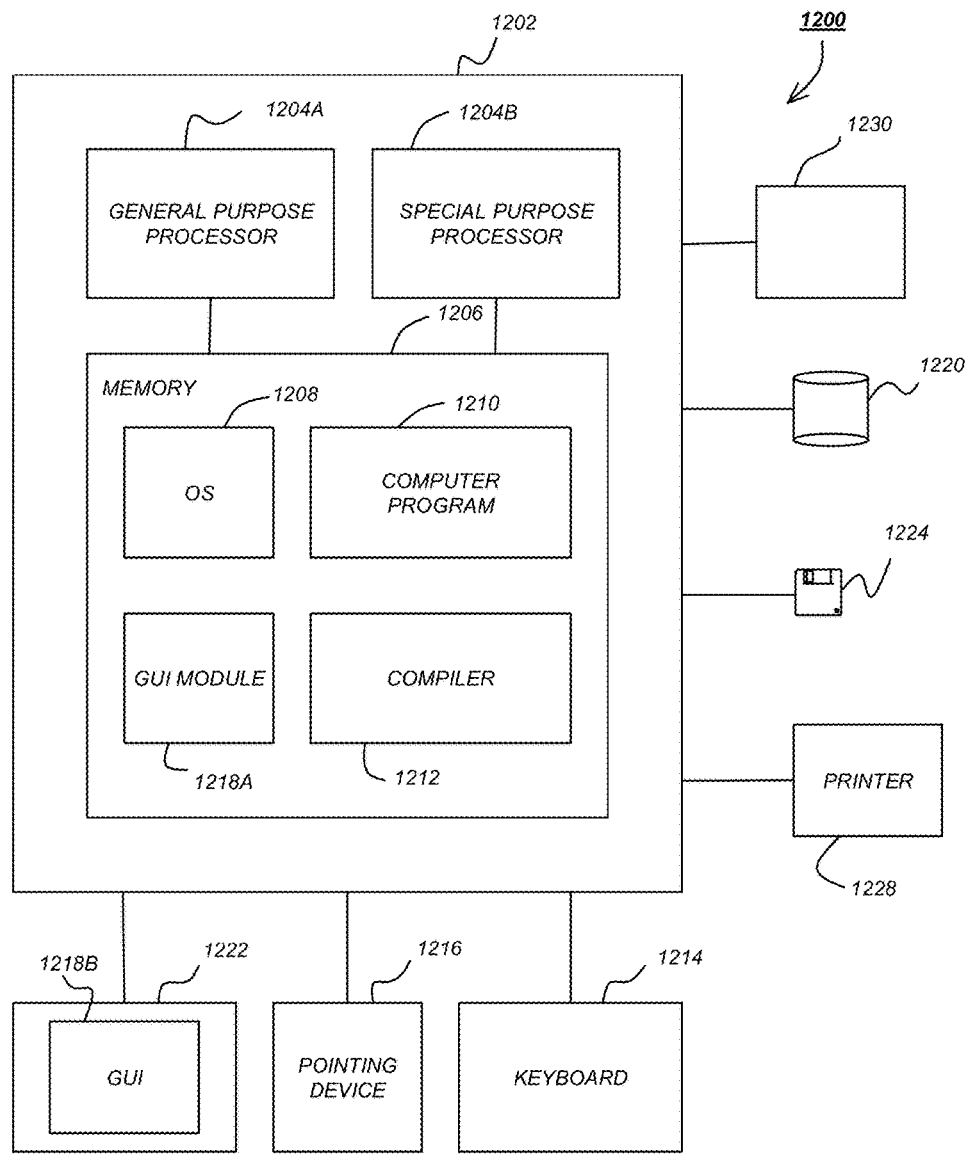
FIG. 12 is a diagram illustrating an exemplary computer system 100 that could be used to implement elements of the system

FIG. 12 is a diagram illustrating an exemplary computer system 1200 that could be used to implement elements of the transmission system. The computer 1202 comprises a general purpose hardware processor 1204A and/or a special purpose hardware processor 1204B (hereinafter alternatively collectively referred to as processor 1204) and a memory 1206, such as random access memory (RAM). The computer 1202 may be coupled to other devices, including input/output (I/O) devices such as a keyboard 1214, a mouse device 1216 and a printer 1228.

In one embodiment, the computer 1202 operates by the general purpose processor 1204A performing instructions defined by the computer program 1210 under control of an operating system 1208. The computer program 1210 and/or the operating system 1208 may be stored in the memory 1206 and may interface with the user and/or other devices to accept input and commands and, based on such input and commands and the instructions defined by the computer program 1210 and operating system 1208 to provide output and results.

Output/results may be presented on the display 1222 or provided to another device for presentation or further processing or action. In one embodiment, the display 1222 comprises a liquid crystal display (LCD) having a plurality of separately addressable pixels formed by liquid crystals. Each pixel of the display 1222 changes to an opaque or translucent state to form a part of the image on the display in response to the data or information generated by the processor 1204 from the application of the instructions of the computer program 1210 and/or operating system 1208 to the input and commands. Other display 1222 types also include picture elements that change state in order to create the image presented on the display 1222. The image may be provided through a graphical user interface (GUI) module 1218A. Although the GUI module 1218A is depicted as a separate module, the instructions performing the GUI functions can be resident or distributed in the operating system 1208, the computer program 1210, or implemented with special purpose memory and processors.

Some or all of the operations performed by the computer 1202 according to the computer program 1210 instructions may be implemented in a special purpose processor 1204B. In this embodiment, some or all of the computer program 1210 instructions may be implemented via firmware instructions stored in a read only memory (ROM), a programmable read only memory (PROM) or flash memory within the special purpose process 1204B or in memory 1206. The special purpose processor 1204B may also be hardwired through circuit design to perform some or all of the operations to implement the present system. Further, the special purpose processor 1204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1202 may also implement a compiler 1212 which allows a computer application program 1210 written in a programming language such as COBOL, C++, FORTRAN, or other language to be translated into processor 1204 readable code. After completion, the application or computer program 1210 accesses and manipulates data accepted from I/O devices and stored in the memory 1206 of the computer 1202 using the relationship and logic that was generated using the compiler 1212.

The computer 1202 also optionally comprises an external communication device such as a modem, satellite link, Ethernet card, or other device for accepting input from and providing output to other computers.

In one embodiment, instructions implementing the operating system 1208, the computer program 1210, and/or the compiler 1212 are tangibly embodied in a computer-readable medium, e.g., data storage device 1220, which could include one or more fixed or removable data storage devices, such as a zip drive, floppy disc drive 1224, hard drive, CD-ROM drive, tape drive, or a flash drive. Further, the operating system 1208 and the computer program 1210 are composed of computer program 1210 instructions which, when accessed, read and executed by the computer 1202, cause the computer 1202 to perform the steps necessary to implement and/or use the present system or to load the program of instructions into a memory 206, thus creating a special purpose data structure causing the computer to operate as a specially programmed computer executing the method steps described herein. Computer program 1210 and/or operating instructions may also be tangibly embodied in memory 1206 and/or data communications devices 1230, thereby making a computer program product or article of manufacture. As such, the terms "article of manufacture," "program storage device" and "computer program product" "computer readable storage device" as used herein are intended to encompass a computer program accessible from any computer readable device or media.

Of course, those skilled in the art will recognize that any combination of the above components, or any number of different components, peripherals, and other devices, may be used with the computer 1202.

Although the term "computer" is referred to herein, it is understood that the computer may include portable devices such as cell phones, portable MP3 players, video game consoles, notebook computers, pocket computers, or any other device with suitable processing, communication, and input/output capability.

The foregoing description embodiments has been presented for the purposes of illustration. It is not intended to be exhaustive or to limit the disclosure to the precise form described. Many modifications and variations are possible in light of the above teaching.

What is claimed is:

1. A method for transmitting a plurality of elementary data streams to a plurality of receivers, comprising the steps of:
   generating M data streams comprising K multiplexed elementary data streams in a first entity wherein K≠T, comprising;
      statistically multiplexing the K elementary data streams into a single intermediate data stream having a peak bit rate less than a sum of the peak bit rates of each of the K elementary data streams; and
      generating the M data streams by demultiplexing the single intermediate data stream;
   wirelessly transmitting the M data streams to a second entity;
   generating N transmitter streams from the M data streams in the second entity by performing steps comprising:
      multiplexing the M data streams in the second entity to generate a single data stream; and
      demultiplexing the single data stream into N transmitter streams in the second entity;
   transmitting each of the N transmitter streams to the plurality of receivers using an associated one of N broadcast sub-transmitters;
   wherein:
      each of the K multiplexed elementary data streams has an associated temporally varying bit rate $BRD_1(t)$, $BRD_2(t), \ldots, BRD_K(t)$;
      the single intermediate data stream comprises a bit rate of $$BRS(t) \geq \sum_{i=1}^{K} BRD_i(t);$$

each of the N broadcast sub-transmitters has an associated maximum bit transmission rate of $BRT_1$, $BRT_2, \ldots, BRT_N$; and
      N is selected such that $$\sum_{i=1}^{N-1} BRT_i < BRS(t) \leq \sum_{i=1}^{N} BRT_i$$

for all time t.

2. The method of claim 1, wherein:
   the method further comprises the steps of:
      error correction encoding the single intermediate data stream; and
      the M data streams are generated from the error correction encoded single intermediate data stream.

3. The method of claim 1, wherein M=1 and N is an integer greater than or equal to two.

4. The method of claim 1, wherein N=1 and M is an integer greater than or equal to two.

5. The method of claim 1, wherein M=N and M and N are integers greater than one.

6. The method of claim 1, wherein M≠N and M and N are integers greater than one.

7. The method of claim 1, wherein a bit rate of the single intermediate data stream exceeds the bit rate of any of the N broadcast sub-transmitters but does not exceed the combined bit rate of the N broadcast sub-transmitters.

8. The method of claim 1, wherein
   the second entity comprises a plurality of satellites comprising a first satellite and a second satellite;
   a subset of the M data streams is transmitted to the first satellite and another subset of the remaining M data streams are transmitted to the second satellite.

9. The method of claim 1, wherein the transmitter streams are multiplexed to recover the single data stream.

10. The method of claim 1, wherein the N broadcast sub-transmitters each use a different, non-contiguous portions of a signal spectrum.

11. The method of claim 9, wherein the recovered single data stream is forward error correction decoded.

12. The method of claim 10, wherein the different portions of the signal spectrum comprise guard bands in the signal spectrum.

13. The method of claim 10, wherein at least one of the N broadcast sub-transmitters has a different bandwidth than the other of the N broadcast sub-transmitters.

14. The method of claim 11, wherein the recovered single data stream is demultiplexed to recover at least one of the K elementary data streams.

15. An apparatus for transmitting a plurality of elementary data streams to a plurality of receivers, comprising:
   a signal distributor, for generating M data streams comprising K multiplexed elementary data streams wherein K≠M, comprising:
      a statistical multiplexer, for statistically multiplexing the K elementary data streams into a single intermediate data stream having a peak bit rate less than a sum of the peak bit rates of each of the K elementary data streams; and
      a demultiplexer for generating the M data streams from the single intermediate data stream;
   a broadcast transmitter, having N broadcast sub-transmitters, the broadcast transmitter for wirelessly receiving the M data streams from the signal distributor, for generating N broadcast sub-transmitter data streams from the received M data streams, and transmitting the N broadcast sub-transmitter data streams via an associated one of the N broadcast sub-transmitters to the plurality of receivers;
   wherein the broadcast transmitter generates the N transmitter streams from the M data streams by multiplexing the M data streams to generate a single data stream and demultiplexing the single data stream into N transmitter streams in the second entity;
   wherein:
      each of the K multiplexed elementary data streams has an associated temporally varying bit rate $BRD_1(t)$, $BRD_2(t), \ldots, BRD_K(t)$;
      the single intermediate data stream comprises a bit rate of $$BRS(t) \geq \sum_{i=1}^{K} BRD_i(t);$$

each of the N broadcast sub-transmitters has an associated maximum bit transmission rate of $BRT_1$, $BRT_2, \ldots, BRT_N$; and
      N is selected such that $$\sum_{i=1}^{N-1} BRT_i < BRS(t) \leq \sum_{i=1}^{N} BRT_i$$

for all time t.

16. The apparatus of claim 15, wherein the signal distributor further comprises:
an encoder, for encoding the single intermediate data stream and providing the encoded single intermediate data stream to the demultiplexer.

17. The apparatus of claim 15, wherein M=1 and N is an integer greater than or equal to two.

18. The apparatus of claim 15, wherein N=1 and M is an integer greater than or equal to two.

19. The apparatus of claim 15, wherein M=N and M and N are integers greater than one.

20. The apparatus of claim 15, wherein M≠N and M and N are integers greater than one.

21. The apparatus of claim 15, wherein a bit rate of the single intermediate data stream exceeds the bit rate of any of the N broadcast sub-transmitters but does not exceed the combined bit rate of the N broadcast sub-transmitters.

22. The apparatus of claim 15, wherein:
the signal distributor comprises an uplink transmitter comprising a plurality of uplink sub transmitters;
the broadcast transmitter comprises a plurality of satellites comprising a first satellite and a second satellite; and
a subset of the M data streams is transmitted to the first satellite by a first subset of the plurality of uplink sub-transmitters and another subset of the remaining M data streams are transmitted to the second satellite by another subset of the plurality of uplink subtransmitters.

23. The apparatus of claim 15, further comprising:
a multiplexer for multiplexing the N broadcast sub-transmitter streams to recover the single data stream; and
a demultiplexer, for demultiplexing the recovered single data stream to recover at least one of the K elementary data streams.

24. The apparatus of claim 15, further comprising:
a multiplexer for multiplexing the N broadcast sub-transmitter streams to recover the single data stream; and
a decoder for decoding the recovered single data stream;
a demultiplexer, for demultiplexing the recovered single data stream to recover at least one of the K elementary data streams.

25. The apparatus of claim 15, wherein the N broadcast sub-transmitters each use a different, non contiguous portion of a signal spectrum.

26. The apparatus of claim 25, wherein the different portions of the signal spectrum comprise guard bands in the signal spectrum.

27. The apparatus of claim 25, wherein the different portions of the signal spectrum comprise legacy bands and guard bands in the signal spectrum.

28. A method for transmitting a plurality of elementary data streams to a plurality of receivers, comprising the steps of:
generating M data streams comprising K multiplexed elementary data streams in a first entity, comprising;
statistically multiplexing the K elementary data streams into a single intermediate data stream having a peak bit rate less than a sum of the peak bit rates of each of the K elementary data streams; and
generating the M data streams by demultiplexing the single intermediate data stream;
wirelessly transmitting the M data streams to a second entity;
generating N transmitter streams from the M data streams in the second entity by performing steps comprising:
multiplexing the M data streams in the second entity to generate a single data stream; and
demultiplexing the single data stream into N transmitter streams in the second entity;
transmitting each of the N transmitter streams to the plurality of receivers using an associated one of N broadcast sub-transmitters;
wherein:
each of the K multiplexed elementary data streams has an associated temporally varying bit rate $BRD_1(t)$, $BRD_2(t)$, ..., $BRD_K(t)$;
the single intermediate data stream comprises a bit rate of $$BRS(t) \geq \sum_{i=1}^{K} BRD_i(t);$$

each of the N broadcast sub-transmitters has an associated maximum bit transmission rate of $BRT_1$, $BRT_2$, ..., $BRT_N$; and
N is selected such that $$\sum_{i=1}^{N-1} BRT_i < BRS(t) \leq \sum_{i=1}^{N} BRT_i$$

for all time t.

29. The method of claim 28, wherein:
the method further comprises the steps of:
error correction encoding the single intermediate data stream; and
the M data streams are generated from the error correction encoded single intermediate data stream.

30. The method of claim 28, wherein
the second entity comprises a plurality of satellites comprising a first satellite and a second satellite;
a subset of the M data streams is transmitted to the first satellite and another subset of the remaining M data streams are transmitted to the second satellite.

31. The method of claim 28, wherein the transmitter streams are multiplexed to recover the single data stream.

32. The method of claim 28, wherein the N broadcast sub-transmitters each use a different, non-contiguous portions of a signal spectrum.

33. The method of claim 32, wherein the different portions of the signal spectrum comprise guard bands in the signal spectrum.

34. The method of claim 32, wherein at least one of the N broadcast sub-transmitters has a different bandwidth than the other of the N broadcast sub-transmitters.

35. The method of claim 34, wherein the recovered single data stream is forward error correction decoded.

36. An apparatus for transmitting a plurality of elementary data streams to a plurality of receivers, comprising:
a signal distributor, for generating M data streams comprising K multiplexed elementary data streams, comprising:
a statistical multiplexer, for statistically multiplexing the K elementary data streams into a single intermediate data stream having a peak bit rate less than a sum of the peak bit rates of each of the K elementary data streams; and a demultiplexer for generating the M data streams from the single intermediate data stream;

a broadcast transmitter, having N broadcast sub-transmitters, the broadcast transmitter for wirelessly receiving the M data streams from the signal distributor, for generating N broadcast sub-transmitter data streams from the received M data streams, and transmitting the N broadcast sub-transmitter data streams via an associated one of the N broadcast sub-transmitters to the plurality of receivers;

wherein:

the broadcast transmitter generates the N transmitter streams from the M data streams by multiplexing the M data streams to generate a single data stream and demultiplexing the single data stream into N transmitter streams in the second entity; and each of the K multiplexed elementary data streams has an associated temporally varying bit rate $BRD_1(t)$, $BRD_2(t), \ldots, BRD_K(t)$;

the single intermediate data stream comprises a bit rate of $$BRS(t) \geq \sum_{i=1}^{K} BRD_i(t)$$

each of the N broadcast sub-transmitters has an associated maximum bit transmission rate of $BRT_1, BRT_2, \ldots, BRT_N$; and N is selected such that $$\sum_{i=1}^{N-1} BRT_i < BRS(t) \leq \sum_{i=1}^{N} BRT_i$$

for all time t.

37. The method of claim 36, wherein the recovered single data stream is demultiplexed to recover at least one of the K elementary data streams.

38. The apparatus of claim 36, wherein the signal distributor further comprises:

an encoder, for encoding the single intermediate data stream and providing the encoded single intermediate data stream to the demultiplexer.

39. The apparatus of claim 36, wherein:

the signal distributor comprises an uplink transmitter comprising a plurality of uplink sub transmitters;

the broadcast transmitter comprises a plurality of satellites comprising a first satellite and a second satellite; and a subset of the M data streams is transmitted to the first satellite by a first subset of the plurality of uplink sub-transmitters and another subset of the remaining M data streams are transmitted to the second satellite by another subset of the plurality of uplink subtransmitters.

40. The apparatus of claim 36, further comprising:

a multiplexer for multiplexing the N broadcast sub-transmitter streams to recover the single data stream; and a demultiplexer, for demultiplexing the recovered single data stream to recover at least one of the K elementary data streams.

41. The apparatus of claim 36, further comprising:

a multiplexer for multiplexing the N broadcast sub-transmitter streams to recover the single data stream; and a decoder for decoding the recovered single data stream;

a demultiplexer, for demultiplexing the recovered single data stream to recover at least one of the K elementary data streams.

42. The apparatus of claim 36, wherein the N broadcast sub-transmitters each use a different, non contiguous portion of a signal spectrum.

43. The apparatus of claim 42, wherein the different portions of the signal spectrum comprise guard bands in the signal spectrum.

44. The apparatus of claim 42, wherein the different portions of the signal spectrum comprise legacy bands and guard bands in the signal spectrum.

\* \* \* \* \*